(12) United States Patent
Minagata

(10) Patent No.: US 9,972,821 B2
(45) Date of Patent: May 15, 2018

(54) POWER STORAGE DEVICE

(71) Applicant: KABUSHIKI KAISHA TOYOTA JIDOSHOKKI, Kariya-shi, Aichi-ken (JP)

(72) Inventor: Atsushi Minagata, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 141 days.

(21) Appl. No.: 14/387,642

(22) PCT Filed: Mar. 26, 2013

(86) PCT No.: PCT/JP2013/058694
§ 371 (c)(1),
(2) Date: Sep. 24, 2014

(87) PCT Pub. No.: WO2013/146735
PCT Pub. Date: Oct. 3, 2013

(65) Prior Publication Data
US 2015/0086847 A1 Mar. 26, 2015

(30) Foreign Application Priority Data
Mar. 27, 2012 (JP) .................................. 2012-072109

(51) Int. Cl.
*H01M 2/26* (2006.01)
*H01M 2/30* (2006.01)
*H01M 2/22* (2006.01)

(52) U.S. Cl.
CPC ............ *H01M 2/305* (2013.01); *H01M 2/22* (2013.01); *H01M 2/26* (2013.01); *H01M 2220/20* (2013.01)

(58) Field of Classification Search
CPC ............ H01M 2/22; H01M 2/26; H01M 4/70; H01M 4/75; H01M 2/0217; H01M 2/0473; H01M 2/1061; H01M 10/647
See application file for complete search history.

(56) References Cited

U.S. PATENT DOCUMENTS

2002/0094478 A1 7/2002 Holland
2006/0051667 A1* 3/2006 Kim ...................... H01M 2/22
429/184
(Continued)

FOREIGN PATENT DOCUMENTS

JP 7-226232 A 8/1995
JP 7-302616 A 11/1995
(Continued)

OTHER PUBLICATIONS

International Search Report of PCT/JP2013/058694, dated Jun. 4, 2013. [PCT/ISA/210].
(Continued)

*Primary Examiner* — Christina Chern
(74) *Attorney, Agent, or Firm* — Sughrue Mion, PLLC

(57) ABSTRACT

When an electrode assembly of a power storage device is viewed from the front in the direction of lamination, the distance between a positive electrode electricity collecting portion and an imaginary reference line passing through the center of the electrode assembly is different from the distance between a negative electrode electricity collecting portion and the imaginary reference line. Therefore, the electrode assembly has an asymmetrical structure.

14 Claims, 6 Drawing Sheets

(56) References Cited

U.S. PATENT DOCUMENTS

| | | | |
|---|---|---|---|
| 2009/0169990 A1 | 7/2009 | Gardner et al. | |
| 2010/0124694 A1* | 5/2010 | Hikata | B26F 1/384 |
| | | | 429/94 |
| 2011/0070477 A1* | 3/2011 | Fujiwara | H01M 2/22 |
| | | | 429/152 |

FOREIGN PATENT DOCUMENTS

| | | |
|---|---|---|
| JP | 2001-35476 A | 2/2001 |
| JP | 2002-42774 A | 2/2002 |
| JP | 2008-251260 A | 10/2008 |
| JP | 2009-81066 A | 4/2009 |
| JP | 2011-505671 A | 2/2011 |

OTHER PUBLICATIONS

Communication dated Dec. 2, 2015, issued by the State Intellectual Property Office of the P.R.C. in corresponding Chinese Application No. 201380016048.5.

Communication dated Oct. 1, 2014 from the International Bureau of WIPO in counterpart International Patent Application No. PCT/JP2013/058694.

* cited by examiner

Fig.7(a) T1

|   | 1 | 2 | 3 | 4 | 5 |
|---|---|---|---|---|---|
| A | 2 | 1 | 0 | 1 | 2 |
| B | $\sqrt{5}$ | $\sqrt{2}$ | 1 | $\sqrt{2}$ | $\sqrt{5}$ |
| C | $\sqrt{8}$ | $\sqrt{5}$ | 2 | $\sqrt{5}$ | $\sqrt{8}$ |

Fig.7(b) T2

|   | 1 | 2 | 3 | 4 | 5 |
|---|---|---|---|---|---|
| A | 0 | 1 | 2 | 3 | 4 |
| B | 1 | $\sqrt{2}$ | $\sqrt{5}$ | $\sqrt{10}$ | $\sqrt{17}$ |
| C | 2 | $\sqrt{5}$ | $\sqrt{8}$ | $\sqrt{13}$ | $\sqrt{20}$ |

Fig.7(c) T3

|   | 1 | 2 | 3 | 4 | 5 |
|---|---|---|---|---|---|
| A | 1 | 0 | 1 | 2 | 3 |
| B | $\sqrt{2}$ | 1 | $\sqrt{2}$ | $\sqrt{5}$ | $\sqrt{10}$ |
| C | $\sqrt{5}$ | 2 | $\sqrt{5}$ | $\sqrt{8}$ | $\sqrt{13}$ |

POWER STORAGE DEVICE

CROSS REFERENCE TO RELATED APPLICATIONS

This application is a National Stage of International Application No. PCT/JP2013/058694 filed Mar. 26, 2013, claiming priority based on Japanese Patent Application No. 2012-072109, filed Mar. 27, 2012, the contents of all of which are incorporated herein by reference in their entirety.

TECHNICAL FIELD

The present invention relates to a power storage device.
Vehicles such as electric vehicles (EV) and plug-in hybrid vehicles (PHV) are provided with a secondary battery such as a lithium ion battery as a power storage device that stores electricity to be supplied to a drive source, that is, an electric motor. These types of secondary batteries are disclosed, for example, in Patent Documents 1 and 2. The secondary battery includes an electrode assembly of a multi-layer structure, in which a negative electrode formed by coating metallic foil with a negative electrode active material, a positive electrode formed by coating metallic foil with a positive electrode active material, and a separator that is made of a microporous film and insulates the negative electrode and the positive electrode from each other are laminated.

PRIOR ART DOCUMENTS

Patent Document 1: Japanese Laid-Open Patent Publication No. 7-226232
Patent Document 2: Japanese Laid-Open Patent Publication No. 7-302616

SUMMARY OF THE INVENTION

Problems that the Invention is to Solve

In the secondary battery, by connecting terminals to the positive electrode and the negative electrode configuring the electrode assembly, electricity is taken out to the outside through the terminals. However, in the secondary battery, when electricity is taken out from the electrodes through the terminals, the output decreases due to the resistance of the metallic foil serving as the passage of the electricity. Thus, in the secondary battery, it is desirable to increase electricity collection efficiency from the electrodes and improve the output.

Accordingly, it is an objective of the present invention to increase electricity collection efficiency from the electrodes and increase the output.

Means for Solving the Problems

To achieve the foregoing objective, and in accordance with a first aspect of the present invention, a power storage device is provided that includes an electrode assembly having a multi-layer structure in which a positive electrode and a negative electrode are insulated from and laminated with each other, a positive electrode terminal that exchanges electricity with the positive electrode, and a negative electrode terminal that exchanges electricity with the negative electrode. The positive electrode includes a positive electrode metallic thin plate and a positive electrode active material layer formed by coating the positive electrode metallic thin plate with a positive electrode active material. A positive electrode electricity collecting portion that is a portion not coated with the positive electrode active material is formed on the positive electrode metallic thin plate. The positive electrode electricity collecting portion includes a positive electrode connecting portion serving as a connection portion with the positive electrode terminal and extends from one end of the positive electrode. The negative electrode includes a negative electrode metallic thin plate and a negative electrode active material layer formed by coating the negative electrode metallic thin plate with a negative electrode active material. A negative electrode electricity collecting portion that is a portion not coated with the negative electrode active material is formed on the negative electrode metallic thin plate. The negative electrode electricity collecting portion includes a negative electrode connecting portion serving as a connection portion with the negative electrode terminal and extends from one end of the negative electrode. When the electrode assembly is viewed from the front in the laminating direction, a width direction is defined as a direction orthogonal to a direction in which the positive electrode electricity collecting portion and the negative electrode electricity collecting portion extend. A line that passes through a center, in the width direction, of a layer portion that is a region in which the positive electrode active material layer and the negative electrode active material layer overlap and extends in a direction in which the positive electrode electricity collecting portion and the negative electrode electricity collecting portion extend is defined as an imaginary reference line. A line that passes through a center of the positive electrode electricity collecting portion in the width direction and extends in a direction in which the positive electrode electricity collecting portion extends is defined as a first imaginary central line. A line that passes through a center of the negative electrode electricity collecting portion in the width direction and extends in a direction in which the negative electrode electricity collecting portion extends is defined as a second imaginary central line. A distance between the imaginary reference line and the first imaginary central line in the width direction is different from a distance between the imaginary reference line and the second imaginary central line in the width direction.

In accordance with a second aspect of the present invention, a power storage device is provided that includes an electrode assembly having a multi-layer structure in which a positive electrode and a negative electrode are insulated from and laminated with each other, a positive electrode terminal that takes out electricity from the positive electrode, and a negative electrode terminal that takes out electricity from the negative electrode. The positive electrode includes a positive electrode metallic thin plate and a positive electrode active material layer formed by coating the positive electrode metallic thin plate with a positive electrode active material. A positive electrode electricity collecting portion that is a portion not coated with the positive electrode active material is formed on the positive electrode metallic thin plate. The positive electrode electricity collecting portion includes a positive electrode connecting portion serving as a connection portion with the positive electrode terminal and extends from one end of the positive electrode. The negative electrode includes a negative electrode metallic thin plate and a negative electrode active material layer formed by coating the negative electrode metallic thin plate with a negative electrode active material. A negative electrode electricity collecting portion that is a portion not coated with the negative electrode active material is formed on the negative electrode metallic thin plate. The negative electrode electricity collecting portion includes a negative electrode connecting portion serving as a connection portion with the negative electrode terminal and extends from one end of the negative electrode. When a width direction of a layer portion that is a region in which the positive electrode active material layer and negative electrode active material layer overlap in the electrode assembly is assumed to be a direction orthogonal to a direction in which the positive electrode electricity collecting portion and the negative electrode electricity collecting portion extend, a line that passes through a center of the electrode assembly in the width direction of the layer portion and extends in a direction in which the positive electrode electricity collecting portion and the negative electrode electricity collecting portion extend is defined as an imaginary reference line. When a width direction of the positive electrode electricity collecting portion is assumed to be a direction orthogonal to a direction in which the positive electrode electricity collecting portion extends, a line that passes through a center of the positive electrode electricity collecting portion in the width direction of the positive electrode electricity collecting portion and extends in a direction in which the positive electrode electricity collecting portion extends is defined as a first imaginary central line. When a width direction of the negative electrode electricity collecting portion is assumed to be a direction orthogonal to a direction in which the negative electrode electricity collecting portion extends, a line that passes through a center of the negative electrode electricity collecting portion in the width direction of the negative electrode electricity collecting portion and extends in a direction in which the negative electrode electricity collecting portion extends is defined as a second imaginary central line. A distance between the imaginary reference line and the first imaginary central line in the width direction of the layer portion is different from a distance between the imaginary reference line and the second imaginary central line in the width direction of the layer portion, so that the electrode assembly has an asymmetric structure.

In accordance with a third aspect of the present invention, a power storage device is provided that includes an electrode assembly having a multi-layer structure in which a positive electrode and a negative electrode are insulated from and laminated with each other, a positive electrode terminal that takes out electricity from the positive electrode, and a negative electrode terminal that takes out electricity from the negative electrode. The positive electrode includes a positive electrode metallic thin plate and a positive electrode active material layer formed by coating the positive electrode metallic thin plate with a positive electrode active material. A positive electrode electricity collecting portion that is a portion not coated with the positive electrode active material is formed on the positive electrode metallic thin plate. The positive electrode electricity collecting portion includes a positive electrode connecting portion serving as a connection portion with the positive electrode terminal and extends from one end of the positive electrode. The negative electrode includes a negative electrode metallic thin plate and a negative electrode active material layer formed by coating the negative electrode metallic thin plate with a negative electrode active material. A negative electrode electricity collecting portion that is a portion not coated with the negative electrode active material is formed on the negative electrode metallic thin plate. The negative electrode electricity collecting portion includes a negative electrode connecting portion serving as a connection portion with the negative electrode terminal and extends from one end of the negative electrode. When a width direction of a layer portion that is a region in which the positive electrode active material layer and negative electrode active material layer overlap in the electrode assembly is assumed to be a direction orthogonal to a direction in which the positive electrode electricity collecting portion and the negative electrode electricity collecting portion extend, a line that passes through a center of the electrode assembly in the width direction of the layer portion and extends in a direction in which the positive electrode electricity collecting portion and the negative electrode electricity collecting portion extend is defined as an imaginary reference line. An end portion positioned near the imaginary reference line among portions of the positive electrode metallic thin plate that configure the positive electrode electricity collecting portion is defined as a first end portion. An end portion positioned near the imaginary reference line among portions of the negative electrode metallic thin plate that configure the negative electrode electricity collecting portion is defined as a second end portion. A distance between the imaginary reference line and the first end portion in the width direction of the layer portion is different from a distance between the imaginary reference line and the second end portion in the width direction of the layer portion, so that the electrode assembly has an asymmetric structure.

In accordance with a fourth aspect of the present invention, a power storage device is provided that includes an electrode assembly having a multi-layer structure in which a positive electrode and a negative electrode are insulated from and laminated with each other, a positive electrode terminal that takes out electricity from the positive electrode, and a negative electrode terminal that takes out electricity from the negative electrode. The positive electrode includes a positive electrode metallic thin plate and a positive electrode active material layer formed by coating the positive electrode metallic thin plate with a positive electrode active material. A positive electrode electricity collecting portion that is a portion not coated with the positive electrode active material is formed on the positive electrode metallic thin plate. The positive electrode electricity collecting portion includes a positive electrode connecting portion serving as a connection portion with the positive electrode terminal and extends from one end of the positive electrode. The negative electrode includes a negative electrode metallic thin plate and a negative electrode active material layer formed by coating the negative electrode metallic thin plate with a negative electrode active material. A negative electrode electricity collecting portion that is a portion not coated with the negative electrode active material is formed on the negative electrode metallic thin plate. The negative electrode electricity collecting portion includes a negative electrode connecting portion serving as a connection portion with the negative electrode terminal and extends from one end of the negative electrode. When a width direction of a layer portion that is a region in which the positive electrode active material layer and negative electrode active material layer overlap in the electrode assembly is assumed to be a direction orthogonal to a direction in which the positive electrode electricity collecting portion and the negative electrode electricity collecting portion extend, a line that passes through a center of the electrode assembly in the width direction of the layer portion and extends in a direction in which the positive electrode electricity collecting portion and the negative electrode electricity collecting portion extend is defined as an imaginary reference line. When a width direction of the positive electrode connecting portion is assumed to be a direction orthogonal to a direction in which the positive electrode electricity collecting portion extends, a line that passes through a center of the positive electrode connecting portion in the width direction of the positive electrode connecting portion and extends in a direction in which the positive electrode electricity collecting portion extends is defined as a first imaginary connection central line. When a width direction of the negative electrode connecting portion is assumed to be a direction orthogonal to a direction in which the negative electrode electricity collecting portion extends, a line that passes through a center of the negative electrode connecting portion in the width direction of the negative electrode connecting portion and extends in a direction in which the negative electrode electricity collecting portion extends is defined as a second imaginary connection central line. A distance between the imaginary reference line and the first imaginary connection central line in the width direction of the layer portion is different from a distance between the imaginary reference line and the second imaginary connection central line in the width direction of the layer portion, so that the electrode assembly has an asymmetric structure.

In accordance with a fifth aspect of the present invention, a power storage device is provided that includes an electrode assembly having a multi-layer structure in which a positive electrode and a negative electrode are insulated from and laminated with each other, a positive electrode terminal that takes out electricity from the positive electrode, and a negative electrode terminal that takes out electricity from the negative electrode. The positive electrode includes a positive electrode metallic thin plate and a positive electrode active material layer formed by coating the positive electrode metallic thin plate with a positive electrode active material. A positive electrode electricity collecting portion that is a portion not coated with the positive electrode active material is formed on the positive electrode metallic thin plate. The positive electrode electricity collecting portion includes a positive electrode connecting portion serving as a connection portion with the positive electrode terminal and extends from one end of the positive electrode. The negative electrode includes a negative electrode metallic thin plate and a negative electrode active material layer formed by coating the negative electrode metallic thin plate with a negative electrode active material. A negative electrode electricity collecting portion that is a portion not coated with the negative electrode active material is formed on the negative electrode metallic thin plate. The negative electrode electricity collecting portion includes a negative electrode connecting portion serving as a connection portion with the negative electrode terminal and extends from one end of the negative electrode. When a width direction of a layer portion that is a region in which the positive electrode active material layer and negative electrode active material layer overlap in the electrode assembly is assumed to be a direction orthogonal to a direction in which the positive electrode electricity collecting portion and the negative electrode electricity collecting portion extend, a line that passes through a center of the electrode assembly in the width direction of the layer portion and extends in a direction in which the positive electrode electricity collecting portion and the negative electrode electricity collecting portion extend is defined as an imaginary reference line. A portion of the positive electrode terminal that is positioned near the imaginary reference line is defined as a first terminal end portion, the positive electrode terminal being connected to the positive electrode connecting portion. A portion of the negative electrode terminal that is positioned near the imaginary reference line is defined as a second terminal end portion, the negative electrode terminal being connected to the negative electrode connecting portion. A distance between the imaginary reference line and the first terminal end portion in the width direction of the layer portion is different from a distance between the imaginary reference line and the second terminal end portion in the width direction of the layer portion, so that the electrode assembly has an asymmetric structure.

According to the first to fifth aspects, the electricity collecting portion of one electrode is near the imaginary reference line. In other words, the electricity collecting portion is near the center, in the width direction, of the region in which the positive electrode active material layer overlaps the negative electrode active material layer. Thus, when electricity is taken out from the electricity collecting portion of the electrode near the center, the electricity is less likely to receive resistance of the metallic foil. Thus, it is possible to increase the electricity collection efficiency from the electrode. As a result, it is possible to increase the output.

In the power storage device according to one of the first to fifth aspects, preferably, the positive electrode metallic thin plate is different in resistance per unit distance from the negative electrode metallic thin plate, and one of the two distances that is related to an electrode including a metallic thin plate having large resistance per unit distance is smaller than the other distance related to the other electrode. As a result, the electricity collecting portion of the electrode including the metallic thin plate having large resistance is near the center, in the width direction, of the region in which the positive electrode active material layer overlaps the negative electrode active material layer. Thus, it is possible to increase the electricity collection efficiency from the electrode. As a result, it is possible to effectively increase the output.

In the power storage device according to one of the first to fifth aspects, when a width direction of a region in which the positive electrode active material layer and the negative electrode active material layer overlap in the laminating direction of the electrode assembly is assumed to be a direction orthogonal to the direction in which the positive electrode electricity collecting portion and the negative electrode electricity collecting portion extend, the imaginary reference line may be a line that passes through the center of the electrode assembly in a width direction of the region and extends in a direction in which the positive electrode electricity collecting portion and the negative electrode electricity collecting portion extend. Thus, it is possible to suitably increase the electricity collection efficiency from the electrode. As a result, it is possible to effectively increase the output.

In the power storage device according to one of the first to fifth aspects, the positive electrode electricity collecting portion and the negative electrode electricity collecting portion may extend in the same direction. Thus, when the electricity collecting portion extends in the same direction, the electricity collecting portion of one electrode can be arranged near the center, in the width direction, of the region in which the positive electrode active material layer overlaps the negative electrode active material layer. As a result, it is possible to increase the electricity collection efficiency from the electrode and increase the output.

In the power storage device according to one of the first to fifth aspects, the electrode assembly may be configured such that positive electrodes and negative electrodes are alternately laminated. Thus, it is possible to increase the electricity collection efficiency from the electrode and increase the output in the power storage device including the electrode assembly of the lamination type, in which positive electrodes and negative electrodes are laminated.

In the power storage device according to one of the first to fifth aspects, the power storage device may be a secondary battery. Thus, it is possible to increase the electricity collection efficiency from the electrode in the secondary battery. As a result, it is possible to increase the battery output.

Effects of the Invention

According to the invention, it is possible to increase electricity collection performance from an electrode and increase the output.

BRIEF DESCRIPTION OF THE DRAWINGS

FIGS. 7(a) to 7(c) are explanatory diagrams for describing results of calculation of distances according to the position of the electricity collecting portion in the secondary battery;

MODES FOR CARRYING OUT THE INVENTION

One embodiment of the present invention will now be described with reference to FIGS. 1 to 7.

Figure 1:
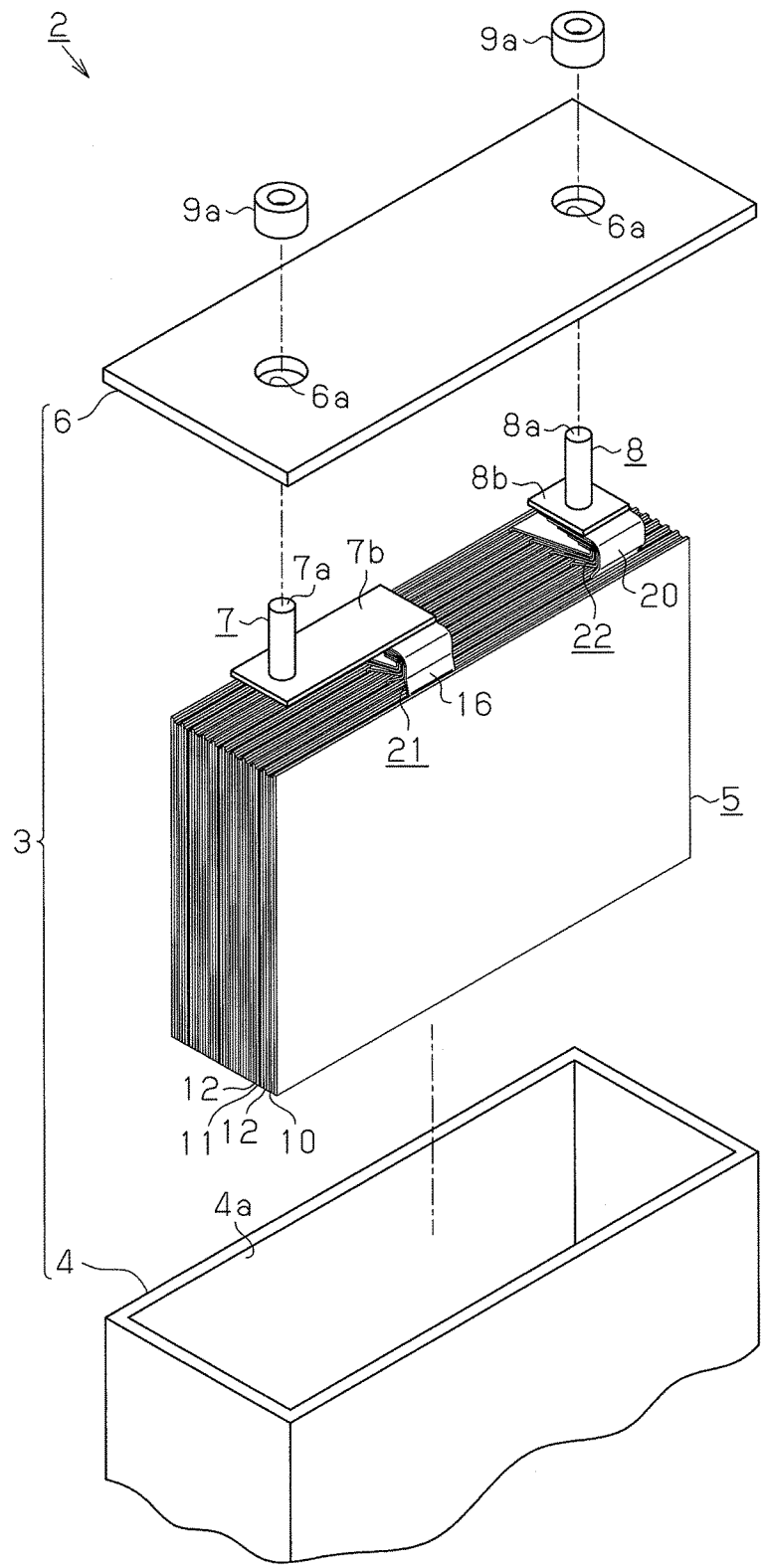
FIG. 1 is an exploded perspective view of a secondary battery according to one embodiment of the invention.
Figure 2:
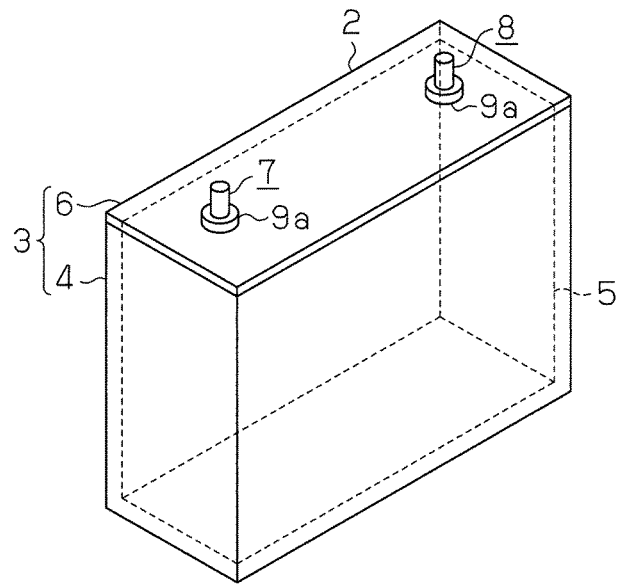
FIG. 2 is a perspective view illustrating the external appearance of the secondary battery.

A secondary battery 2, which is an power storage device, includes an electrode assembly 5 accommodated in a battery can 3 made of metal, as illustrated in FIGS. 1 and 2. The battery can 3 includes a main body member 4 of a rectangular parallelepiped shape and a lid member 6 of a rectangular plate shape that closes an opening 4a of the main body member 4. Both of the main body member 4 and the lid member 6 are made of metal (for example, stainless steel or aluminum). The secondary battery 2 according to the present embodiment is a rectangular battery, the contour of which is rectangular. Further, the secondary battery 2 according to the present embodiment is a lithium ion battery.

Figure 4:
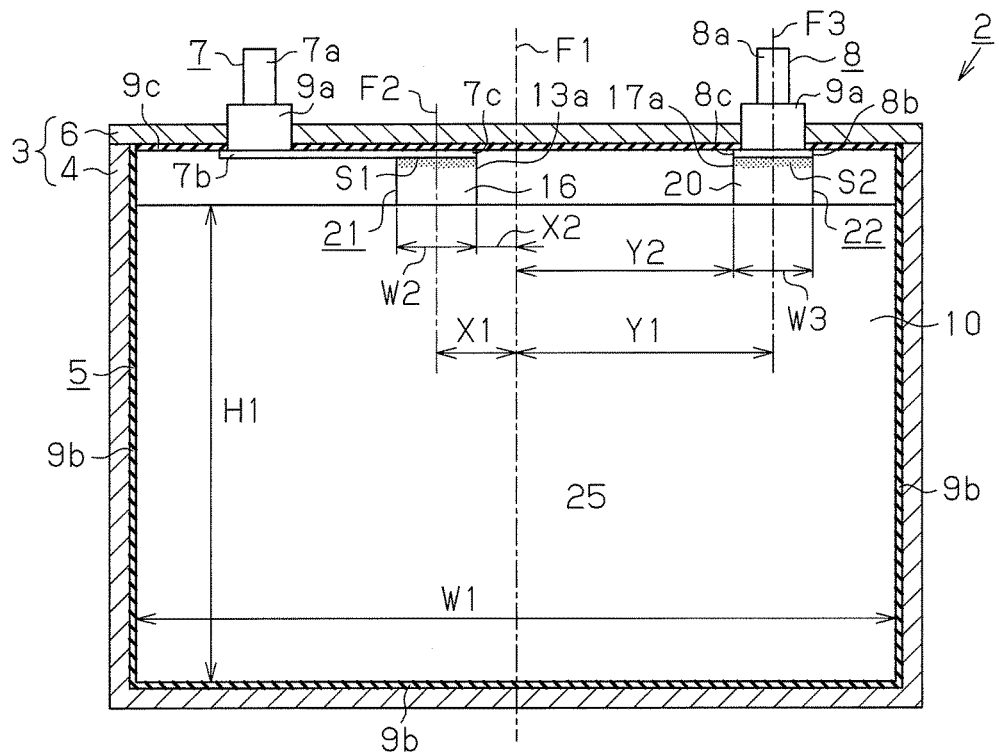
FIG. 4 is a cross-sectional view illustrating the electrode assembly inserted into a battery can.

The electrode assembly 5 is electrically connected with a positive electrode terminal 7 and a negative electrode terminal 8, which are used to exchange electricity with the electrode assembly 5. In the present embodiment, the positive electrode terminal 7 includes an external terminal 7a of a cylindrical shape that is partially exposed outside the battery can 3 and an internal terminal 7b of a sheet shape that is entirely accommodated inside the battery can 3, as illustrated in FIG. 4. In the present embodiment, the negative electrode terminal 8 includes an external terminal 8a of a cylindrical shape that is partially exposed outside the battery can 3 and an internal terminal 8b of a sheet shape that is entirely accommodated inside the battery can 3, as illustrated in FIG. 4. The external terminal 7a of the positive electrode terminal 7 and the external terminal 8a of the negative electrode terminal 8 are exposed outside the battery can 3 through a pair of opening holes 6a formed in the lid member 6 with an a predetermined interval. Insulation rings 9a for insulating the positive electrode terminal 7 and the negative electrode terminal 8 from the battery can 3 are attached to the positive electrode terminal 7 and the negative electrode terminal 8. An insulation sheet 9b for insulating the main body member 4 made of metal from the electrode assembly 5 accommodated in the battery can 3 is attached to the inner face of the main body member 4 of the battery can 3, as illustrated in FIG. 4. An insulation sheet 9c for insulating the lid member 6 made of metal from the electrode assembly 5 accommodated in the battery can 3 is attached to the inner face of the lid member 6 of the battery can 3, as illustrated in FIG. 4. Thus, when the electrode assembly 5 is accommodated in the battery can 3, the insulation sheets 9b and 9c are located between the inner face of the battery can 3 and the contour face of the electrode assembly 5. Accordingly, the battery can 3 and the electrode assembly 5 are electrically insulated from each other.

Figure 3:
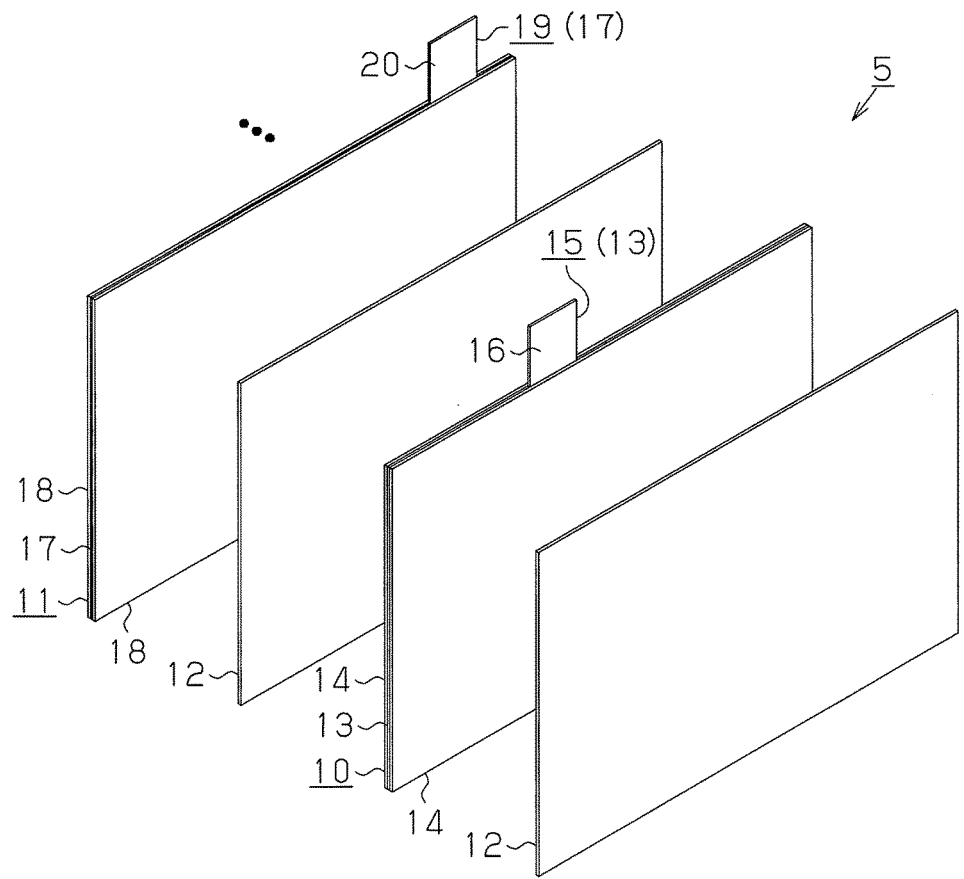
FIG. 3 is an exploded perspective view illustrating components of an electrode assembly of the secondary battery.
Figure 5:
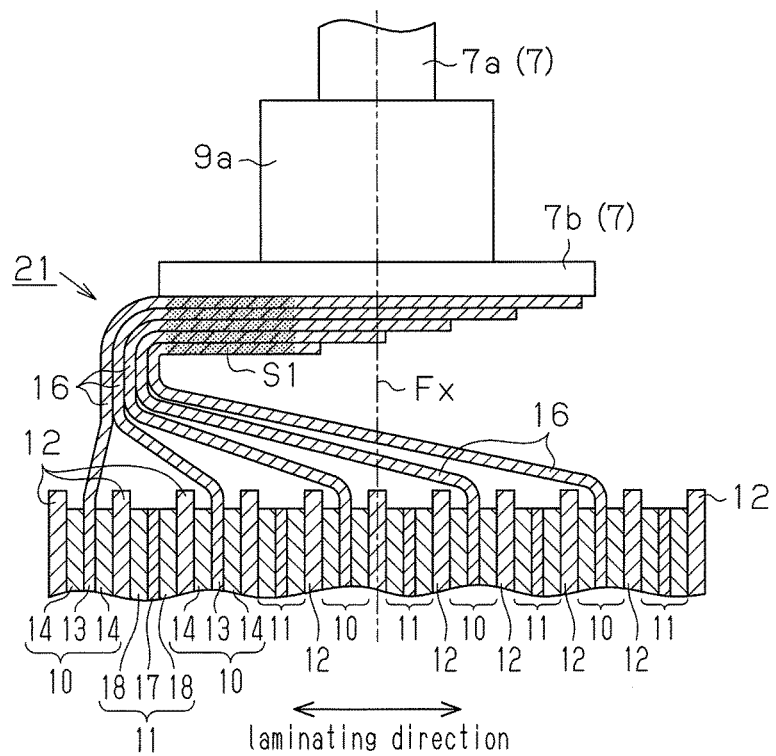
FIG. 5 is a cross-sectional view illustrating a connection state between an electricity collecting portion and a terminal in the secondary battery.

The electrode assembly 5 includes positive electrode sheets 10 serving as positive electrodes and negative electrode sheets 11 serving as negative electrodes, as illustrated in FIG. 3. Each positive electrode sheet 10 includes a positive electrode metallic foil (an aluminum foil in the present embodiment) 13, which is a positive electrode metallic thin plate, and a positive electrode active material layer 14 formed by coating both faces of the positive electrode metallic foil 13 with a positive electrode active material. Each negative electrode sheet 11 includes a negative electrode metallic foil (a copper foil in the present embodiment) 17, which is a negative electrode metallic thin plate, and a negative electrode active material layer 18 formed by coating both faces of the negative electrode metallic foil 17 with a negative electrode active material. The electrode assembly 5 has a multi-layer structure in which the positive electrode sheets 10 and the negative electrode sheets 11 are laminated with separators 12, each of which insulates a positive electrode sheet 10 and a negative electrode sheet 11 from each other and is located therebetween. For example, the electrode assembly 5 is configured such that positive electrode sheets 10 and negative electrode sheets 11 are alternately laminated, as illustrated in FIG. 5. In other words, the electrode assembly 5 includes a plurality of sets each of which includes a positive electrode sheet 10, a negative electrode sheet 11, and a separator 12.

A positive electrode tab portion 15 composed of a part of the positive electrode metallic foil 13 is formed at the edge of each positive electrode sheet 10, as illustrated in FIG. 3. The positive electrode tab portion 15 includes a positive electrode electricity collecting portion 16, which is a region not coated with the positive electrode active material layer 14. The positive electrode electricity collecting portion 16 is composed of a part of the positive electrode metallic foil 13, like the positive electrode tab portion 15. In the present embodiment, the entire region of the positive electrode tab portion 15 serves as the positive electrode electricity collecting portion 16. The positive electrode electricity collecting portion 16 is formed at the edge of each positive electrode sheet 10. The positive electrode tab portions 15 or the positive electrode electricity collecting portions 16 are formed at the same position in the respective positive electrode sheets 10 and have the same shape.

The negative electrode tab portion 19 composed of a part of the negative electrode metallic foil 17 is formed at the edge of each negative electrode sheet 11. The negative electrode tab portion 19 includes a negative electrode electricity collecting portion 20, which is a region not coated with the negative electrode active material layer 18. The negative electrode electricity collecting portion 20 is composed of a part of the negative electrode metallic foil 17, like the negative electrode tab portion 19. In the present embodiment, the entire region of the negative electrode tab portion 19 serves as the negative electrode electricity collecting portion 20. The negative electrode electricity collecting portion 20 is formed at the edge of each negative electrode sheet 11. The negative electrode tab portions 19 or the negative electrode electricity collecting portions 20 are formed at the same position in the respective negative electrode sheets 11 and have the same shape. Regions coated with an active material in the positive electrode sheets 10 and the negative electrode sheets 11 are coated portions, and regions not coated with an active material are non-coated portions.

The positive electrode sheets 10 of the electrode assembly 5 are laminated such that the positive electrode electricity collecting portions 16 of the positive electrode sheets 10 are arranged in line in the laminating direction of the positive electrode sheets 10. Similarly, the negative electrode sheets 11 of the electrode assembly 5 are laminated such that the negative electrode electricity collecting portions 20 of the negative electrode sheets 11 are arranged in line in the laminating direction of the negative electrode sheets 11 at the position where the negative electrode electricity collecting portions 20 do not overlap the positive electrode electricity collecting portions 16. The positive electrode electricity collecting portions 16 are gathered into one within the thickness of the electrode assembly 5 to form a positive electrode electricity collecting group 21, as illustrated in FIG. 1. Similarly, the negative electrode electricity collecting portions 20 are gathered into one within the thickness of the electrode assembly 5 to form a negative electrode electricity collecting group 22, as illustrated in FIG. 1.

The internal terminal 7b of the positive electrode terminal 7 is electrically connected to the positive electrode electricity collecting group 21. Likewise, the internal terminal 8b of the negative electrode terminal 8 is electrically connected to the negative electrode electricity collecting group 22. The internal terminal 7b of the positive electrode terminal 7 and the internal terminal 8b of the negative electrode terminal 8 are respectively connected to the positive electrode electricity collecting group 21 and the negative electrode electricity collecting group 22 by resistance welding. The resistance welding refers to a technique of welding in a state in which a connection target is located between a pair of positive and negative welding electrodes. In the present embodiment, through resistance welding, the internal terminal 7b of the positive electrode terminal 7 is connected to the positive electrode electricity collecting portions 16 of the positive electrode electricity collecting group 21, and the internal terminal 8b of the negative electrode terminal 8 is connected to the negative electrode electricity collecting portions 20 of the negative electrode electricity collecting group 22. In the present embodiment, as illustrated in FIG. 4, a portion at which the internal terminal 7b of the positive electrode terminal 7 is connected with the positive electrode electricity collecting group 21, that is, the positive electrode electricity collecting portions 16 is a positive electrode connecting portion S1. In the present embodiment, as illustrated in FIG. 4, a portion at which the internal terminal 8b of the negative electrode terminal 8 is connected with the negative electrode electricity collecting group 22, that is, the negative electrode electricity collecting portions 20 is a negative electrode connecting portion S2.

Next, the electrode assembly 5 according to the present embodiment will be described.

Both the positive electrode sheets 10 and the negative electrode sheets 11 of the electrode assembly 5 are formed in rectangular shapes as viewed from the front, as illustrated in FIG. 3. In the present embodiment, the positive electrode sheets 10 and the negative electrode sheets 11 have the same size. In other words, the lengths of the positive electrode sheets 10 in the longitudinal direction and the transverse direction are equal to the lengths of the negative electrode sheets 11 in the longitudinal direction and the transverse direction, respectively.

The positive electrode tab portions 15 are each formed at the edge of one side extending in the longitudinal direction of a positive electrode sheet 10 to extend in the transverse direction of the positive electrode sheet 10. In the present embodiment, the direction in which the positive electrode tab portion 15 extends is the same as the direction in which the positive electrode electricity collecting portion 16 extends. In other words, the positive electrode electricity collecting portion 16 is formed to extend from one end of the positive electrode sheet 10. The remaining region of the positive electrode sheet 10 excluding the positive electrode tab portion 15, that is, the positive electrode electricity collecting portion 16 is coated with a positive electrode active material. Thus, in each positive electrode sheet 10 according to the present embodiment, the positive electrode active material layer 14 is formed in a rectangular shape as viewed from the front. Electricity can be taken out from the positive electrode sheet 10 through the positive electrode electricity collecting portion 16. In other words, electricity to be taken out from the positive electrode sheet 10 flows along an electricity collection path that extends toward the positive electrode electricity collecting portion 16 via the portion of the positive electrode metallic foil 13 that is coated with the positive electrode active material layers 14.

The negative electrode tab portions 19 are each formed at the edge of one side extending in the longitudinal direction of a negative electrode sheet 11 to extend in the transverse direction of the negative electrode sheet 11. In the present embodiment, the direction in which the negative electrode tab portion 19 extends is the same as the direction in which the negative electrode electricity collecting portion 20 extends. In other words, the negative electrode electricity collecting portion 20 is formed to extend from one end of the negative electrode sheet 11. The remaining region of the negative electrode sheet 11 excluding the negative electrode tab portion 19, that is, the negative electrode electricity collecting portion 20 is coated with a negative electrode active material. Thus, in each negative electrode sheet 11 according to the present embodiment, the negative electrode active material layer 18 is formed in a rectangular shape as viewed from the front. Electricity can be taken out from the negative electrode sheet 11 through the negative electrode electricity collecting portion 20. In other words, electricity to be taken out from the negative electrode sheet 11 flows along an electricity collection path that extends toward the negative electrode electricity collecting portion 20 via the portion of the negative electrode metallic foil 17 that is coated with the negative electrode active material layers 18.

The positive electrode sheets 10 and the negative electrode sheets 11 having the above configuration are laminated such that the positive electrode electricity collecting portions 16 and the negative electrode electricity collecting portions 20 extend in the same direction, as illustrated in FIGS. 3 and 4. In the present embodiment, the electrode assembly 5, which is configured such that the positive electrode sheets 10 and the negative electrode sheets 11 are laminated, is accommodated in the battery can 3 such that the positive electrode electricity collecting portions 16 and the negative electrode electricity collecting portions 20 face the lid member 6. In the present embodiment, when the positive electrode sheets 10 and the negative electrode sheets 11 are laminated, the active material layers, that is, each positive electrode active material layer 14 and the corresponding negative electrode active material layer 18 face each other with a separator 12 located therebetween in the entire region. Thus, in the electrode assembly 5, a layer portion 25 is formed as a region (a portion having a layered shape) in which the positive electrode active material layers 14 overlap the negative electrode active material layers 18. A width direction W1 of the layer portion 25 is in parallel with a direction orthogonal to the direction in which the positive electrode electricity collecting portions 16 and the negative electrode electricity collecting portions 20 extend, as illustrated in FIG. 4. The width direction W1 of the layer portion 25 is in parallel with a plane of the electrode assembly 5. In the present embodiment, the width direction W1 of the layer portion 25 is also in parallel with the longitudinal direction of the positive electrode sheets 10 and the negative electrode sheets 11. A height direction H1 of the layer portion 25 is in parallel with the direction in which the positive electrode electricity collecting portions 16 and the negative electrode electricity collecting portions 20 extend, as illustrated in FIG. 4. In the present embodiment, the height direction H1 of the layer portion 25 is also in parallel with the transverse direction of the positive electrode sheets 10 and the negative electrode sheets 11.

In the electrode assembly 5, as illustrated in FIG. 4, the positive electrode electricity collecting portions 16 and the negative electrode electricity collecting portions 20 are arranged in parallel in the width direction W1 of the layer portion 25. In other words, the width direction of the positive electrode sheets 10 and the negative electrode sheets 11 is orthogonal to the direction in which the positive electrode electricity collecting portions 16 and the negative electrode electricity collecting portions 20 extend. A width direction W2 of the positive electrode electricity collecting portions 16 is orthogonal to the direction in which the positive electrode electricity collecting portions 16 extend and in parallel with the width direction W1 of the layer portion 25. A width direction W3 of the negative electrode electricity collecting portions 20 is orthogonal to the direction in which the negative electrode electricity collecting portions 20 extend and in parallel with the width direction W1 of the layer portion 25.

As illustrated in FIG. 4, in the electrode assembly 5 according to the present embodiment, when the electrode assembly 5 is viewed from the front in the laminating direction, an imaginary reference line F1, a first imaginary central line F2, and a second imaginary central line F3 are defined. The imaginary reference line F1 is a line that passes through the center of the electrode assembly 5 in the width direction W1 and extends in the direction in which the positive electrode electricity collecting portions 16 and the negative electrode electricity collecting portions 20 extend when the longitudinal direction of the electrode assembly 5, that is, the width direction W1 of the layer portion 25 is assumed to be a direction orthogonal to the direction in which the positive electrode electricity collecting portions 16 and the negative electrode electricity collecting portions 20 extend. The first imaginary central line F2 is a line that passes through the center of the positive electrode electricity collecting portions 16 in the width direction W2 and extends in the direction in which the positive electrode electricity collecting portion 16 extends when the width direction W2 of the positive electrode electricity collecting portions 16 is assumed to be the direction orthogonal to the direction in which the positive electrode electricity collecting portions 16 extend. The second imaginary central line F3 is a line that passes through the center of the negative electrode electricity collecting portions 20 in the width direction W3 and extends in the direction in which the negative electrode electricity collecting portions 20 extend when the width direction W3 of the negative electrode electricity collecting portions 20 is assumed to be the direction orthogonal to the direction in which the negative electrode electricity collecting portions 20 extend. In the electrode assembly 5 according to the present embodiment, the positive electrode electricity collecting portions 16 and the negative electrode electricity collecting portions 20 are arranged at asymmetric positions centering on the imaginary reference line F1 when the imaginary reference line F1, the first imaginary central line F2, and the second imaginary central line F3 are defined as described above. In other words, the positive electrode electricity collecting portions 16 and the negative electrode electricity collecting portions 20 are arranged at asymmetric positions centering on the imaginary reference line F1 when the electrode assembly 5 is viewed from the front in the laminating direction.

Specifically, the positive electrode electricity collecting portions 16 are formed on the positive electrode sheets 10 such that the distance between the imaginary reference line F1 and the first imaginary central line F2 in the width direction W1 and the width direction W2 is equal to a distance X1, which is a first inter-center distance. Likewise, the negative electrode electricity collecting portions 20 are formed on the negative electrode sheets 11 such that the distance between the imaginary reference line F1 and the second imaginary central line F3 in the width direction W1 and the width direction W3 is equal to a distance Y1, which is a second inter-center distance.

In the present embodiment, the positive electrode electricity collecting portions 16 and the negative electrode electricity collecting portions 20 are formed to have the same size. In other words, the size of the positive electrode electricity collecting portions 16 in the width direction W2 is equal to the size of the negative electrode electricity collecting portions 20 in the width direction W2. Thus, in the electrode assembly 5 according to the present embodiment, the positive electrode electricity collecting portions 16 (the positive electrode electricity collecting group 21) are arranged to be closer to the center, that is, the imaginary reference line F1 than the negative electrode electricity collecting portions 20 (the negative electrode electricity collecting group 22) when the electrode assembly 5 is viewed from the front in the laminating direction. In other words, the distance X1 between the imaginary reference line F1 and the first imaginary central line F2 is different from the distance Y1 between the imaginary reference line F1 and the second imaginary central line F3. Specifically, the distance X1 is smaller than the distance Y1.

In the electrode assembly 5 according to the present embodiment, as illustrated in FIG. 4, the distance between an end face 13a, which is a first end portion in the positive electrode metallic foil 13 of each positive electrode electricity collecting portion 16, and the imaginary reference line F1 in the width direction W1 and the width direction W2 is denoted by X2. In the electrode assembly 5 according to the present embodiment, as illustrated in FIG. 4, an end face 17a, which is a second end portion in the negative electrode metallic foil 17 of each negative electrode electricity collecting portion 20, and the imaginary reference line F1 is denoted by Y2. The distance X2 is different from the distance Y2. Specifically, the distance X2 is smaller than the distance Y2. The end faces 13a of the positive electrode metallic foils 13 are positioned near the imaginary reference line F1 among the portions of the positive electrode metallic foils 13 configuring the positive electrode electricity collecting portions 16 and are in parallel with the direction orthogonal to the width direction W2 of the positive electrode electricity collecting portions 16, that is, the direction in which the negative electrode electricity collecting portions 20 extend. The end faces 17a of the negative electrode metallic foils 17 are positioned near the imaginary reference line F1 among the portions of the negative electrode metallic foils 17 configuring the negative electrode electricity collecting portions 20 and are in parallel with the direction orthogonal to the width direction W3 of the negative electrode electricity collecting portions 20, that is, the direction in which the negative electrode electricity collecting portions 20 extend.

In the present embodiment, the internal terminal 7b of the positive electrode terminal 7 is connected with the positive electrode electricity collecting portions 16 by the positive electrode connecting portion S1 extending in the width direction W2 of the positive electrode electricity collecting portions 16, as illustrated in FIG. 4. Thus, the first imaginary central line F2 can be expressed as a first imaginary connection central line that passes through the center of the positive electrode connecting portion S1 in the width direction W2 and extends in the direction in which the positive electrode electricity collecting portion 16 extends when the width direction W2 of the positive electrode connecting portion S1 is assumed to be the direction orthogonal to the direction in which the positive electrode electricity collecting portions 16 extend. The distance X1 between the imaginary reference line F1 and the first imaginary central line F2 can be expressed as a first inter-connection distance. In the present embodiment, the internal terminal 8b of the negative electrode terminal 8 is connected with the negative electrode electricity collecting portions 20 by the negative electrode connecting portion S2 extending in the width direction W3 of the negative electrode electricity collecting portions 20, as illustrated in FIG. 4. Thus, the second imaginary central line F3 can be expressed as a second imaginary connection central line that passes through the center of the negative electrode connecting portion S2 in the width direction W3 and extends in the direction in which the negative electrode electricity collecting portions 20 extend when the width direction W3 of the negative electrode connecting portion S2 is assumed to be the direction orthogonal to the direction in which the negative electrode electricity collecting portions 20 extend. The distance Y1 between the imaginary reference line F1 and the second imaginary central line F3 can be expressed as a second inter-connection distance.

In the present embodiment, the internal terminal 7b of the positive electrode terminal 7 is connected to the positive electrode electricity collecting portions 16 and includes a terminal end face 7c, which is a first terminal end portion, to lie on the same plane as (be flush with) the end faces 13a of the positive electrode metallic foils 13, as illustrated in FIG. 4. Thus, the distance X2 between the imaginary reference line F1 and the end faces 13a of the positive electrode metallic foils 13 can be expressed as the distance between the imaginary reference line F1 and the terminal end face 7c, which is a portion of the positive electrode terminal 7 that is positioned near the imaginary reference line F1. In the present embodiment, the internal terminal 8b of the negative electrode terminal 8 is connected to the negative electrode electricity collecting portions 20 and includes a terminal end face 8c, which is a second terminal end portion, to lie on the same plane as (be flush with) the end faces 17a of the negative electrode metallic foils 17, as illustrated in FIG. 4. Thus, the distance Y2 between the imaginary reference line F1 and the end faces 17a of the negative electrode metallic foils 17 can be expressed as the distance between the imaginary reference line F1 and the terminal end face 8c, which is a portion of the negative electrode terminal 8 that is positioned near the imaginary reference line F1.

In the case in which the electrode assembly 5 is configured as described above, the distance X1 and the distance Y1 are respectively different from the distance X2 and the distance Y2 when the electrode assembly 5 is viewed from the front in the laminating direction. Thus, the secondary battery 2 according to the present embodiment includes the electrode assembly 5 of the asymmetric structure accommodated in the internal space of the battery can 3. Specifically, in the electrode assembly 5 of the asymmetric structure according to the present embodiment, the distances X1 and X2 related to the positive electrode electricity collecting portions 16 (the positive electrode electricity collecting group 21) extending from the electrode assembly 5 are smaller than the distances Y1 and Y2 related to the negative electrode electricity collecting portions 20 (the negative electrode electricity collecting group 22), and thus the positive electrode electricity collecting portions 16 are arranged near the imaginary reference line F1.

Operation of the present embodiment will now be described.

An output of the secondary battery 2 can be increased by improving the electricity collection efficiency of the electrode assembly 5. The electricity collection efficiency depends on the resistance of metallic foils configuring an electrode. In metallic foils having the same configuration, the resistance of metallic foils is in proportion to the length of the path of electricity to an electricity collecting portion to which a terminal is connected, that is, the length of the electricity collection path. In other words, as the length of the electricity collection path is increased, the influence of the resistance of the metallic foil is increased, and the electricity collection efficiency is lowered. Thus, for an electrode, it is desirable to form the electricity collecting portion at a position at which the electricity collection path can be minimized.

Figure 6:
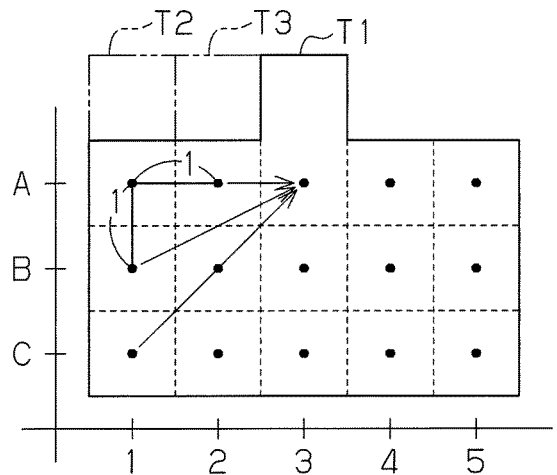
FIG. 6 is a schematic view illustrating distances to the electricity collecting portion in the electrode of the secondary battery.

FIG. 6 and FIGS. 7(a) to 7(c) illustrate examples of calculating the length of electricity collection paths when electricity collecting portions T1, T2, and T3 are formed at different positions on an electrode. In these calculation examples, as illustrated in FIG. 6, an active material layer is divided into two or more regions, and the distance from the center of each region to the center of a region connected to the electricity collecting portion is calculated as illustrated in FIGS. 7(a) to 7(c). In the present embodiment, the total distance obtained by adding respective distances is calculated as the length of the electricity collection path. In these calculation examples, as illustrated in FIG. 6, an active material layer is vertically divided into three sections and horizontally divided into five sections, and the distances are calculated in fifteen regions. Calculations are performed under the assumption that the distance between the centers of adjacent regions in the horizontal direction is 1, and the distance between the centers of adjacent regions in the vertical direction is 1.

FIG. 7(a) shows a calculation example when the electricity collecting portion T1 is formed in a region [A3]. In the case of this example, the distances from regions [A1] to [A5], [B1] to [B5], and [C1] to [C5] to the region [A3], in which the electricity collecting portion T1 is formed, have values shown in FIG. 7(a). The sum of the distances between the respective regions is 26.4 ([A1]+[A2]+ . . . +[A5]+[B1]+ [B2]+ . . . +[B5]+[C1]+[C2]+ . . . +[C5]≈26.4).

FIG. 7(b) shows a calculation example when the electricity collecting portion T2 is formed in the region [A1]. In the case of this example, the distances between the respective regions [A1] to [A5], [B1] to [B5], and [C1] to [C5] to the region [A1], in which the electricity collecting portion T2 is formed, have values shown in FIG. 7(b). The sum of the distances between the respective regions is 37.1 ([A1]+ [A2]+ . . . +[A5]+[B1]+[B2]+ . . . +[B5]+[C1]+ [C2]+ . . . +[C5]β37.1).

FIG. 7(c) shows a calculation example when the electricity collecting portion T3 is formed in the region [A2]. In the case of this example, the distances between the respective regions [A1] to [A5], [B1] to [B5], and [C1] to [C5] to the region [A2], in which the electricity collecting portion T3 is formed, have values shown in FIG. 7(c). The sum of the distances between the respective regions is 29.1 ([A1]+ [A2]+ . . . +[A5]+[B1]+[B2]+ . . . +[B5]+[C1]+ [C2]+ . . . +[C5]≈29.1).

According to the above calculation examples, the length of the electricity collection path in the case of the electricity collecting portion T1 is 26.4, the length of the electricity collection path in the case of the electricity collecting portion T2 is 37.1, and the length of the electricity collection path in the case of the electricity collecting portion T3 is 29.1. Thus, in these calculation examples, the length of the electricity collection path in the case of the electricity collecting portion T1 is smallest, and the length of the electricity collection path in the case of the electricity collecting portion T2 is largest. In other words, it can be understood that when the electricity collecting portion is arrange in the center of the electrode, the length of the electricity collection path is smallest, and the electricity collection efficiency is largest. Further, it can be understood that as the position of the electricity collecting portion is closer to the center of the electrode, the electricity collection efficiency increases.

When the positive electrode metallic foils 13 are made of the aluminum foils and the negative electrode metallic foils 17 are made of the copper foils as in the present embodiment, the metallic foils differ in conductivity. When conductivity of aluminum is compared with conductivity of copper, aluminum has a lower conductivity than copper. In other words, when the aluminum foil and the copper foil have the same thickness, the aluminum foil is larger in resistance per unit distance than the copper foil. The unit distance refers to a distance on the electricity collection path that is directed from the metallic foil toward the electricity collecting portion. According to the configuration of the electrode assembly 5 of the present embodiment, the positive electrode, which use aluminum foils as the positive electrode metallic foils 13, is larger in resistance than the negative electrode, which use copper foils as the negative electrode metallic foils 17.

Thus, in the electrode assembly 5 according to the present embodiment, the positive electrode electricity collecting portions 16, at which the electricity collection efficiency is low, is arranged near the center of the electrode assembly 5, that is, the imaginary reference line F1 based on the above calculation examples, as illustrated in FIG. 4. As a result, in the electrode assembly 5 according to the present embodiment, the electricity collection efficiency on the positive electrode side is improved, and the electricity collection efficiency of the electrode assembly 5 can be consequently improved.

The secondary battery 2, which includes the electrode assembly 5 according to the present embodiment, can improve its battery output. According to the configuration of the secondary battery 2 according to the present embodiment, when it is desired to obtain the same battery output, the coating amount of the active material layer is decreased because of the increased electricity collection efficiency. Thus the size of the secondary battery 2 can be reduced. In a vehicle in which the secondary battery 2 according to the present embodiment is mounted, the traveling performance (acceleration performance, fuel efficiency, and the like) of the vehicle is improved because of the improved battery output.

Thus, according to the present embodiment, the following advantages are achieved.

(1) Of the positive electrode electricity collecting portions 16 and the negative electrode electricity collecting portions 20, the positive electrode electricity collecting portions 16 are arranged near the imaginary reference line F1. Thus, when electricity is taken out from the positive electrode electricity collecting portions 16, which are arranged near the center, the electricity is less likely to receive resistance of the positive electrode metallic foils 13. Thus, the electricity collection efficiency from the positive electrode (the positive electrode sheets 10) is increased. As a result, the battery output is improved.

(2) The positive electrode metallic foils 13, which are composed of the aluminum foils, are larger in resistance per unit distance than the negative electrode metallic foils 17, which are composed of the copper foil. Thus, since the positive electrode electricity collecting portions 16 are arranged near the imaginary reference line F1, the electricity collection efficiency from the positive electrode (the positive electrode sheets 10) is increased. As a result, the battery output is efficiently improved.

(3) When the width direction W1 of the layer portion 25 is assumed to be the direction orthogonal to the direction in which the positive electrode electricity collecting portions 16 and the negative electrode electricity collecting portions 20 extend, the imaginary reference line F1 passes through the center of the electrode assembly 5 in the width direction W1 of the layer portion 25 and extends in the direction in which the positive electrode electricity collecting portions 16 and the negative electrode electricity collecting portions 20 extend. Thus, the electricity collection efficiency from the electrode (the positive electrode in the present embodiment) is suitably increased. As a result, the battery output is efficiently improved.

(4) Of the positive electrode electricity collecting portions 16 and the negative electrode electricity collecting portions 20, which extend in the same direction, the positive electrode electricity collecting portions 16 are arranged near the imaginary reference line F1. As a result, the electricity collection efficiency from the positive electrode (the positive electrode sheets 10) is increased, and the battery output is improved.

(5) When the positive electrode electricity collecting portions 16 and the negative electrode electricity collecting portions 20 are extended in the same direction, the dead space of the battery can 3 will be reduced. As a result, it is possible to prevent the size of the secondary battery 2 from being increased.

(6) The electrode assembly 5 is configured such that positive electrode sheets 10 and negative electrode sheets 11 are laminated. Thus, in the secondary battery 2 including the electrode assembly 5 of the lamination type, the electricity collection efficiency from the electrode (the positive electrode in the present embodiment) is increased, and the battery output is improved.

(7) When the secondary battery 2 according to the present embodiment is mounted in a vehicle, the traveling performance (acceleration performance and fuel efficiency) of the vehicle is improved because of the increased electricity collection efficiency.

The above described embodiment may be modified as follows.

Instead of the positive electrode electricity collecting portions 16, the negative electrode electricity collecting portions 20 may be arranged near the imaginary reference line F1. In other words, the distance Y1 between the imaginary reference line F1 and the second imaginary central line F3 and the distance Y2 between the imaginary reference line F1 and the end faces 17a of the negative electrode metallic foils 17 may be smaller than the distance X1 between the imaginary reference line F1 and the first imaginary central line F2 and the distance X2 between the imaginary reference line F1 and the end faces 13a of the positive electrode metallic foils 13. In this case, the secondary battery 2 includes the electrode assembly 5 of an asymmetric structure. The resistance of a metallic foil decreases as the thickness of the metallic foil increases. Thus, when the resistance per unit distance of each negative electrode metallic foil 17 is larger than the resistance per unit distance of each positive electrode metallic foil 13 as a result of increasing the thickness of each positive electrode metallic foil 13, the negative electrode electricity collecting portions 20 may be arranged near the imaginary reference line F1 as described above.

Figure 8:
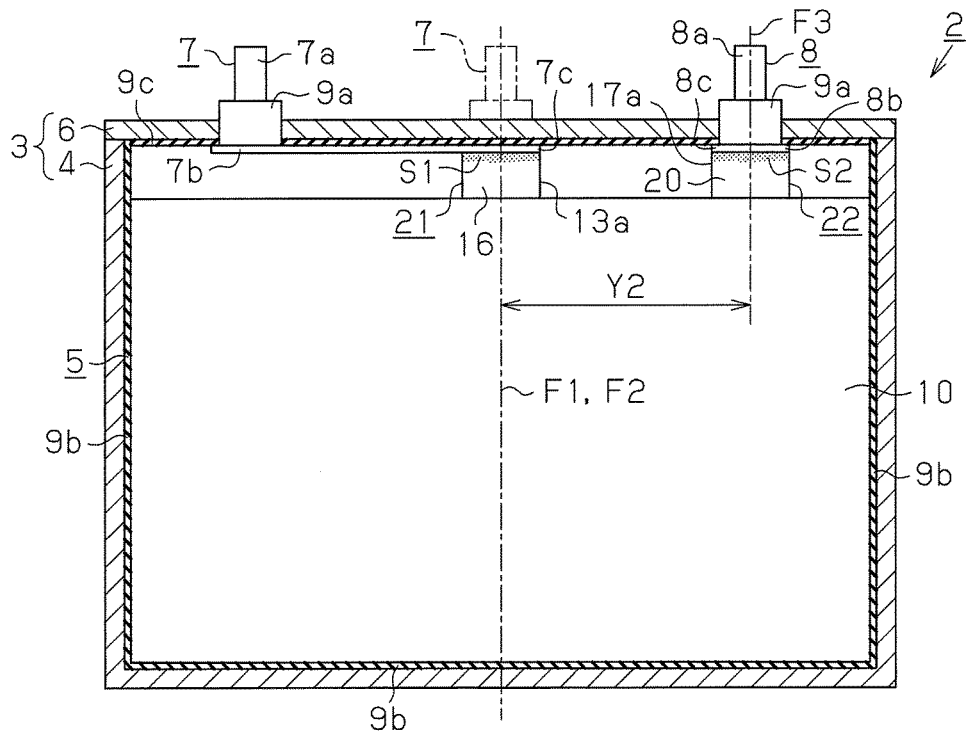
FIG. 8 is a cross-sectional view showing a modification of the present invention.

As illustrated in FIG. 8, the positive electrode electricity collecting portions 16 may be formed such that the imaginary reference line F1 matches with the first imaginary central line F2. In this case, the positive electrode electricity collecting portions 16 are arranged in the center when the electrode assembly 5 is viewed from the front in the laminating direction. Similarly, the negative electrode electricity collecting portions 20 may be formed such that the imaginary reference line F1 matches with the second imaginary central line F3.

The positive electrode terminal 7 may be arranged directly above the positive electrode electricity collecting portions 16 as indicated by long dashed double-short dashed line in FIG. 8. In other words, the connection configuration of the positive electrode electricity collecting portions 16 and the positive electrode terminal 7 may be the same as the connection configuration of the negative electrode electricity collecting portions 20 and the negative electrode terminal 8. When the resistance of the terminal is taken in to consideration, the terminal is preferably arranged, for example, directly above the electricity collecting portion as in the present modification. However, when the resistance of the terminal is small and has little influence on the electricity collection efficiency, either the connection configuration of the above illustrated embodiment or the connection configuration of the present modification may be employed.

Figure 9:
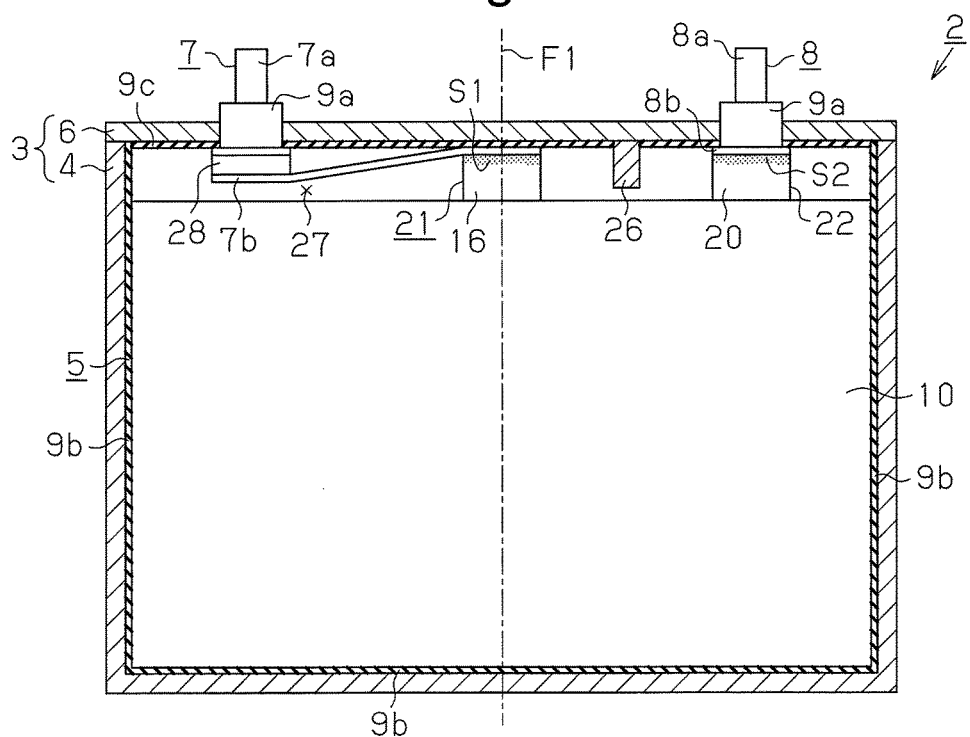
FIG. 9 is a cross-sectional view showing another modification of the present invention.

When the positive electrode electricity collecting portions 16 are arranged near the imaginary reference line F1, the distance between the positive electrode electricity collecting portions 16 and the negative electrode electricity collecting portions 20 is small. Thus, an insulating partition member 26 may be arranged between the positive electrode electricity collecting portions 16 and the negative electrode electricity collecting portions 20, as illustrated in FIG. 9. As a result, it is possible to ensure insulation property between the positive electrode electricity collecting portions 16 and the negative electrode electricity collecting portions 20. The same applies to a case in which the negative electrode electricity collecting portion 20 is arranged near the imaginary reference line F1.

When the positive electrode electricity collecting portions 16 is arranged near the imaginary reference line F1, a space 27 between the positive electrode electricity collecting portions 16 and the inner face of the battery can 3 is relatively large, as illustrated in FIG. 9. Thus, an overcurrent protective circuit 28 may be arranged by using the space 27. The overcurrent protective circuit 28 is located between the external terminal 7a and the internal terminal 7b, and the external terminal 7a is electrically connected with the internal terminal 7b via the overcurrent protective circuit 28. As a result, it is possible to effectively use the space in the battery can 3 and reduce the dead space in the battery can 3. The same applies to a case in which the negative electrode electricity collecting portions 20 are arranged near the imaginary reference line F1.

When there is a sufficient clearance capable of satisfying the insulation property between the inner face of the battery can 3 and the contour face of the electrode assembly 5, the insulation sheet 9c to be attached to the inner face of the battery can 3 may be omitted.

Figure 10A:
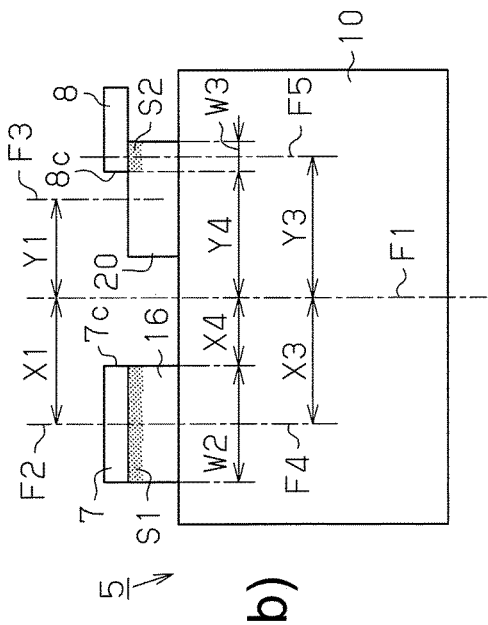
FIGS. 10(a) to 10(d) are explanatory diagrams showing yet another modification of the present invention.

FIGS. 10(a) to 10(d) are diagrams schematically illustrating electrode assemblies 5 according to modifications of the invention. In the modification of FIG. 10(a), the positive electrode electricity collecting portions 16 and the negative electrode electricity collecting portions 20 are arranged at symmetric positions centering on the imaginary reference line F1. In other words, the distance X1 between the imaginary reference line F1 and the first imaginary central line F2 is equal to the distance Y1 between the imaginary reference line F1 and the second imaginary central line F3. In the modification of FIG. 10(a), the connection structure for connecting the positive electrode terminal 7 to the positive electrode electricity collecting portions 16 is different from the connection structure for connecting the negative electrode terminal 8 to the negative electrode electricity collecting portions 20. Specifically, the negative electrode terminal 8 is connected to be separated away from the imaginary reference line F1, and the length of the negative electrode connecting portion S2 in the width direction W3 is smaller than the length of the positive electrode connecting portion S1 in the width direction W2. Further, a distance X3 between the imaginary reference line F1 and a first imaginary connection central line F4 passing through the center of the positive electrode connecting portion S1 is smaller than a distance Y3 between the imaginary reference line F1 and a second imaginary connection central line F5 passing through the center of the negative electrode connecting portion S2. A distance X4 between the terminal end face 7c of the positive electrode terminal 7 and the imaginary reference line F1 is smaller than a distance Y4 between the terminal end face 8c of the negative electrode terminal 8 and the imaginary reference line F1. Even in this configuration, it is possible to improve the electricity collection efficiency on the positive electrode side and the electricity collection efficiency of the electrode assembly 5. In other words, even when the positive electrode electricity collecting portions 16 and the negative electrode electricity collecting portions 20 are arranged at symmetric positions, the electricity collection efficiency differs according to the connection position of the electricity collecting portion and the terminal. The same applies to a case in which the relationship between the positive electrode electricity collecting portions 16 and the negative electrode electricity collecting portions 20 is reversed.

Figure 10B:
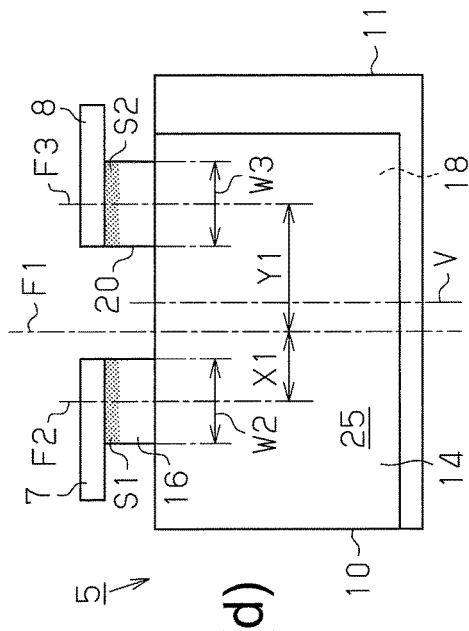

In the modification of FIG. 10(b), the negative electrode electricity collecting portions 20 are arranged to be closer to the imaginary reference line F1 than the positive electrode electricity collecting portions 16. In other words, the distance Y1 between the imaginary reference line F1 and the second imaginary central line F3 is smaller than the distance X1 between the imaginary reference line F1 and the first imaginary central line F2. In the modification of FIG. 10(b), the connection structure for connecting the positive electrode terminal 7 to the positive electrode electricity collecting portions 16 is different from the connection structure for connecting the negative electrode terminal 8 to the negative electrode electricity collecting portions 20. Specifically, the negative electrode terminal 8 is connected to be separated away from the imaginary reference line F1, and the length of the negative electrode connecting portion S2 in the width direction W3 is smaller than the length of the positive electrode connecting portion S1 in the width direction W2. Further, the distance X3 between the imaginary reference line F1 and the first imaginary connection central line F4 passing through the positive electrode connecting portion S1 is smaller than the distance Y3 between the imaginary reference line F1 and the second imaginary connection central line F5 passing through the negative electrode connecting portion S2. The distance X4 between the terminal end face 7c of the positive electrode terminal 7 and the imaginary reference line F1 is smaller than the distance Y4 between the terminal end face 8c of the negative electrode terminal 8 and the imaginary reference line F1. Even in this configuration, it is possible to improve the electricity collection efficiency at the positive electrode and the electricity collection efficiency of the electrode assembly 5. In other words, even when the negative electrode electricity collecting portions 20 are arranged to be closer to the imaginary reference line F1 than the positive electrode electricity collecting portions 16, the electricity collection efficiency differs according to the connection position of the electricity collecting portion and the terminal. The same applies to a case in which the relationship between the positive electrode electricity collecting portions 16 and the negative electrode electricity collecting portions 20 is reversed.

Figure 10C:
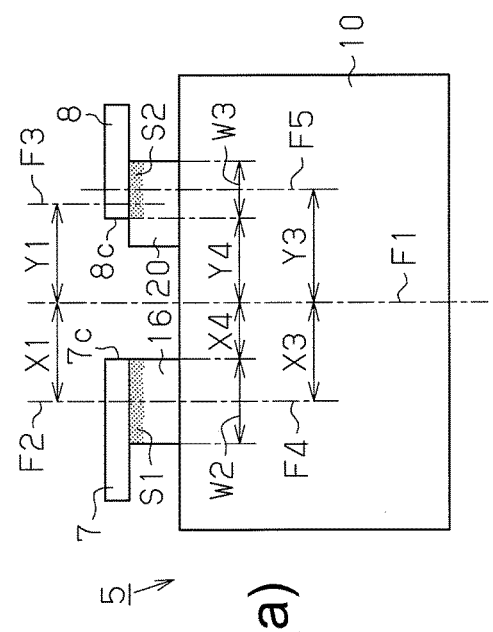

In the modification of FIG. 10(c), both the positive electrode electricity collecting portions 16 and the negative electrode electricity collecting portions 20 are arranged near the imaginary reference line F1, and the positive electrode electricity collecting portions 16 and the negative electrode electricity collecting portions 20 are arranged at symmetric positions centering on the imaginary reference line F1. In other words, the distance X1 between the imaginary reference line F1 and the first imaginary central line F2 is equal to the distance Y1 between the imaginary reference line F1 and the second imaginary central line F3. In the modification of FIG. 10(c), the connection structure for connecting the positive electrode terminal 7 to the positive electrode electricity collecting portions 16 is different from the connection structure for connecting the negative electrode terminal 8 to the negative electrode electricity collecting portions 20. Specifically, the negative electrode terminal 8 is connected to be separated away from the imaginary reference line F1, and the length of the negative electrode connecting portion S2 in the width direction W3 is smaller than the length of the positive electrode connecting portion S1 in the width direction W2. Further, the distance X3 between the imaginary reference line F1 and the first imaginary connection central line F4 passing through the center of the positive electrode connecting portion S1 is smaller than the distance Y3 between the imaginary reference line F1 and the second imaginary connection central line F5 passing through the center of the negative electrode connecting portion S2. The distance X4 between the terminal end face 7c of the positive electrode terminal 7 and the imaginary reference line F1 is smaller than the distance Y4 between the terminal end face 8c of the negative electrode terminal 8 and the imaginary reference line F1. In the modification of FIG. 10(c), the terminal end face 7c is positioned on the imaginary reference line F1. Even in this configuration, it is possible to improve the electricity collection efficiency on the positive electrode side and the electricity collection efficiency of the electrode assembly 5. In other words, even when the positive electrode electricity collecting portions 16 and the negative electrode electricity collecting portions 20 are arranged at symmetric positions, the electricity collection efficiency differs according to the connection position of the electricity collecting portion and the terminal. The same applies to a case in which the relationship between the positive electrode electricity collecting portion 16 and the negative electrode electricity collecting portion 20 is reversed.

Figure 10D:
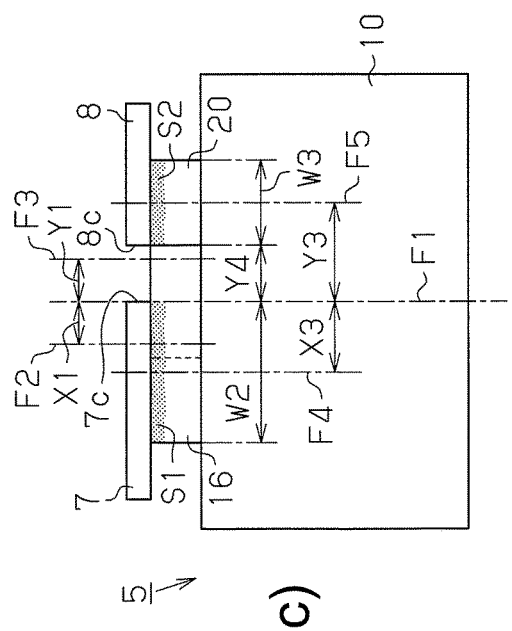

In the modification of FIG. 10(d), the size of the positive electrode sheets 10 is different from the size of the negative electrode sheets 11. Specifically, the size of the positive electrode sheets 10 is smaller than the size of the negative electrode sheets 11. In this case, in the layer portion 25, the positive electrode active material layers 14 of the positive electrode sheets 10 and the negative electrode active material layers 18 of the negative electrode sheets 11 are formed at opposed positions. The imaginary reference line F1 passing through the center of the layer portion 25 differs in position from a negative electrode imaginary reference line V passing through the center of the negative electrode sheets 11 having a size larger than the positive electrode sheets 10. When the size of the positive electrode sheets 10 is different from the size of the negative electrode sheets 11 as described above, the positive electrode electricity collecting portions 16 and the negative electrode electricity collecting portions 20 are arranged by using the imaginary reference line F1 passing through the center of the layer portion 25 as a reference. In other words, in the modification of FIG. 10(d), the positive electrode electricity collecting portions 16 and the negative electrode electricity collecting portions 20 are arranged such that the distance X1 between the imaginary reference line F1 and the first imaginary central line F2 is smaller than the distance Y1 between the imaginary reference line F1 and the second imaginary central line F3. Even in this configuration, it is possible to improve the electricity collection efficiency on the positive electrode side and the electricity collection efficiency of the electrode assembly 5. In other words, even when the size of the positive electrode sheets 10 is different from the size of the negative electrode sheets 11, the electricity collection efficiency differs according to the position of the electricity collecting portion. The same applies to a case in which the relationship between the positive electrode electricity collecting portions 16 and the negative electrode electricity collecting portions 20 is reversed. Further, in the modification of FIG. 10(d), the electricity collection efficiency differs according to the connection position of the electricity collecting portion and the terminal.

In the above illustrated embodiment, the imaginary reference line F1 is defined based on the case in which the electrode assembly 5 is viewed from the front in the laminating direction, but a reference line Fx (corresponding to the imaginary reference line F1) may be defined based on the case in which the electrode assembly 5 is viewed from the side in the direction orthogonal to the laminating direction, as illustrated in FIG. 5. In this case, the width of a region (a portion having a layered shape) in which the positive electrode active material layers 14 overlaps the negative electrode active material layers 18 is in parallel with the thickness of the electrode assembly 5 in the laminating direction of the electrode assembly 5. In this case, the arrangements of the positive electrode electricity collecting portions 16 and the negative electrode electricity collecting portions 20 may be set similarly to the above illustrated embodiment. In other words, when the electrode assembly 5 is viewed from the side, the distance between the positive electrode electricity collecting portions 16 (the positive electrode connecting portion S1) and the reference line Fx may be smaller than the distance between the negative electrode electricity collecting portions 20 (the negative electrode connecting portion S2) and the reference line Fx, and vice versa.

The shapes of the positive electrode sheets 10, the negative electrode sheets 11, and the separators 12 may be changed. For example, the positive electrode sheets 10, the negative electrode sheets 11, and the separators 12 may have square shapes as viewed from front. The connection between the positive electrode electricity collecting portions 16 (the positive electrode electricity collecting group 21) and the positive electrode terminal 7 and the connection between the negative electrode electricity collecting portions 20 (the negative electrode electricity collecting group 22) and the negative electrode terminal 8 are not limited to the configurations of the above illustrated embodiment, but may be arbitrarily changed. For example, the positive electrode electricity collecting portions 16 or the negative electrode electricity collecting portions 20 may be connected to the positive electrode terminal 7 or the negative electrode terminal 8 individually without forming the electricity collecting group. Further, the number of electricity collecting groups included in the electrode assembly 5 or the shapes of the positive electrode terminal 7 and the negative electrode terminal 8 may be arbitrarily changed.

The invention is not limited to the secondary battery 2 of the lamination type as in the above illustrated embodiment and may be applied to a secondary battery of a winding type, in which strip-like positive electrode sheets and strip-like negative electrode sheets are wound and laminated. Even in the secondary battery of the winding type, each positive electrode sheet and the corresponding negative electrode sheet are insulated from each other with a separator located therebetween. When the invention is applied to the secondary battery of the winding type, the positive electrode tab portions 15 (the positive electrode electricity collecting portions 16) and the negative electrode tab portions 19 (the negative electrode electricity collecting portions 20) are preferably formed in the manner described in the above illustrated embodiment.

The entire region of each positive electrode tab portion 15 does not necessarily need to serve as the positive electrode electricity collecting portion 16. In other words, the positive electrode tab portions 15 may each include a coated portion that is a region coated with a positive electrode active material and a non-coated portion that is a region not coated with a positive electrode active material. The entire region of each negative electrode tab portion 19 does not necessarily need to serve as the negative electrode electricity collecting portion 20. In other words, the negative electrode tab portions 19 may each include a coated portion that is a region coated with a negative electrode active material and a non-coated portion that is a region not coated with a negative electrode active material. The coated portions of the positive electrode tab portions 15 and the negative electrode tab portions 19 are formed at outer positions (closer to the side edges) than the non-coated portions thereof.

The positive electrode active material layer 14 may be formed on only one face of each positive electrode metallic foil 13. Similarly, the negative electrode active material layer 18 may be formed on only one face of each negative electrode metallic foil 17.

The positive electrode metallic foils 13 may be aluminum alloy foils. Similarly, the negative electrode metallic foils 17 may be copper alloy foils.

The vehicle in which the secondary battery 2 of the above illustrated embodiment is mounted may be an automobile or an industrial vehicle.

The configuration of the above illustrated embodiment may be applied to other power storage devices such as an electric double layer capacitor.

The secondary battery 2 is not limited to a lithium ion secondary battery and may be a secondary battery of another type. In short, the secondary battery 2 may have any form as long as ions move between a positive electrode active material layer and a negative electrode active material layer, and transfers of charges is performed.

In the above illustrated embodiment, the distances X1, X2, Y1, and Y2 are defined as the distance between specific lines, but the distances X1, X2, Y1, and Y2 may each be defined as the distance between specific planes. Specifically, when the width direction W1 of the layer portion 25 is assumed to be the direction orthogonal to the direction in which the positive electrode electricity collecting portions 16 and the negative electrode electricity collecting portions 20 extend, an imaginary reference plane passing through the center of the layer portion 25 in the width direction W1 is used instead of the imaginary reference line F1. When the width direction W2 of the positive electrode electricity collecting portions 16 is assumed to be the direction orthogonal to the direction in which the positive electrode electricity collecting portions 16 extend, a first imaginary central plane passing through the center of the positive electrode electricity collecting portions 16 in the width direction W2 is used as the first imaginary central line F2. When the width direction W3 of the negative electrode electricity collecting portions 20 is assumed to be the direction orthogonal to the direction in which the negative electrode electricity collecting portions 20 extend, a second imaginary central plane passing through the center of the negative electrode electricity collecting portions 20 in the width direction W3 is used instead of the second imaginary central line F3. The distance between the imaginary reference plane and the first imaginary central plane is defined as X1, and the distance between the imaginary reference plane and the second imaginary central plane is defined as Y1. The distance (a first end portion distance) between the imaginary reference plane and the end face 13a is defined as X2. The distance (a second end portion distance) between the imaginary reference plane and the end face 17a is defined as Y2. Each plane defined herein may be in parallel with the laminating direction of the electrode assembly 5.

In the above modification, the distance between the first imaginary connection central plane passing through the center of the positive electrode connecting portion S1 and the imaginary reference plane may be defined as X1, and the distance between the second imaginary connection central plane passing through the center of the negative electrode connecting portion S2 and the imaginary reference plane may be defined as Y1. Alternatively, in the above modification, the distance between the terminal end face 7c and the imaginary reference plane may be defined as X2, or the distance between the terminal end face 8c and the imaginary reference plane may be defined as Y2. Even in the modifications of FIGS. 10(a) to 10(c), the distances X3, X4, Y3, and Y4 may be similarly defined as the distance between specific planes. Even in the modification of FIG. 10(d), the distances X1 and Y1 may be similarly defined as the distance between specific planes. Each plane defined herein may be in parallel with the laminating direction of the electrode assembly 5.

DESCRIPTION OF THE REFERENCE NUMERALS

2 . . . secondary battery; 5 . . . electrode assembly; 7 . . . positive electrode terminal; 7a . . . external terminal; 7b . . . internal terminal; 7c . . . terminal end face; 8 . . . negative electrode terminal; 8a . . . external terminal; 8b . . . internal terminal; 8c . . . terminal end face; 10 . . . positive electrode sheet; 11 . . . negative electrode sheet; 12 . . . separator; 13 . . . positive electrode metallic foil; 13a . . . end face; 14 . . . positive electrode active material layer; 16 . . . positive electrode electricity collecting portion; 17 . . . negative electrode metallic foil; 17a . . . end face; 18 . . . negative electrode active material layer; 20 . . . negative electrode electricity collecting portion; F1 . . . imaginary reference line; F2 . . . first imaginary central line; F3 . . . second imaginary central line; F4 . . . first imaginary connection central line; F5 . . . second imaginary connection central line; S1 . . . positive electrode connecting portion; S2 . . . negative electrode connecting portion; W1, W2, W3 . . . width direction; X1, X2, X3, X4 . . . distance; Y1, Y2, Y3, Y4 . . . distance.

The invention claimed is:

1. A power storage device, comprising:
an electrode assembly having a multi-layer structure comprising a plurality of separate and non-continuous layers stacked together, wherein the plurality of separate and non-continuous layers include positive electrode sheets and negative electrode sheets;
a battery can that accommodates the electrode assembly;
a positive electrode terminal that takes out electricity from the positive electrode sheets; and
a negative electrode terminal that takes out electricity from the negative electrode sheets, wherein
the positive electrode terminal includes:
 a positive electrode internal terminal that is electrically connected with the positive electrode sheets and accommodated in the battery can; and
 a positive electrode external terminal that is partially exposed outside the battery can,
 each of the positive electrode sheets includes a positive electrode metallic thin plate and a positive electrode active material layer formed by coating the positive electrode metallic thin plate with a positive electrode active material,
 a positive electrode electricity collecting portion that is a portion not coated with the positive electrode active material is formed on the positive electrode metallic thin plate of each of the positive electrode sheets,
 the positive electrode electricity collecting portion of each of the positive electrode sheets includes a positive electrode connecting portion serving as a connection portion with the positive electrode terminal and extends from one end of the positive electrode sheets,
the negative electrode terminal includes:
 a negative electrode internal terminal that is electrically connected with the negative electrode sheets and accommodated in the battery can; and
 a negative electrode external terminal that is partially exposed outside the battery can,
 each of the negative electrode sheets includes a negative electrode metallic thin plate and a negative electrode active material layer formed by coating the negative electrode metallic thin plate with a negative electrode active material,
 a negative electrode electricity collecting portion that is a portion not coated with the negative electrode active material is formed on the negative electrode metallic thin plate of each of the negative electrode sheets,
 the negative electrode electricity collecting portion of each of the negative electrode sheets includes a negative electrode connecting portion serving as a connection portion with the negative electrode terminal and extends from one end of the negative electrode sheets, wherein the positive electrode active material layer and the negative electrode active material layer overlap in a region of the electrode assembly to form an overlapping portion of each layer of the electrode assembly, a width direction of the overlapping portion is a direction orthogonal to a direction in which the positive electrode electricity collecting portion and the negative electrode electricity collecting portion extend, a line that passes through a center located between opposing widthwise edges of the overlapping portion of each layer in the width direction of the overlapping portion and extends in the direction in which the positive electrode electricity collecting portion and the negative electrode electricity collecting portion extend is defined as a reference line, a width direction of the positive electrode electricity collecting portion is a direction orthogonal to a direction in which the positive electrode electricity collecting portion extends, a line that passes through a center of the positive electrode electricity collecting portion in the width direction of the positive electrode electricity collecting portion and extends in the direction in which the positive electrode electricity collecting portion extends is defined as a first central line, a width direction of the negative electrode electricity collecting portion is a direction orthogonal to a direction in which the negative electrode electricity collecting portion extends, a line that passes through a center of the negative electrode electricity collecting portion in the width direction of the negative electrode electricity collecting portion and extends in the direction in which the negative electrode electricity collecting portion extends is defined as a second central line, a distance between the reference line and the first central line in the width direction of the overlapping portion is different from a distance between the reference line and the second central line in the width direction of the overlapping portion, so that the electrode assembly has an asymmetric structure, and one of the positive electrode electricity collecting portion and the negative electrode electricity collecting portion is a first electricity collecting portion, and the other one of the positive electrode electricity collecting portion and the negative electrode electricity collecting portion is a second electricity collecting portion, wherein the first electricity collecting portion is positioned nearer to the reference line than both the second electricity collecting portion and one of the positive electrode external terminal and the negative electrode external terminal that is electrically connected with the first electricity collecting portion.

2. A power storage device, comprising:

an electrode assembly having a multi-layer structure comprising a plurality of separate and non-continuous layers stacked together, wherein the plurality of separate and non-continuous layers include positive electrode sheets and a negative electrode sheets;

a battery can that accommodates the electrode assembly;

a positive electrode terminal that takes out electricity from the positive electrode sheets; and a negative electrode terminal that takes out electricity from the negative electrode sheets, wherein the positive electrode terminal includes:

a positive electrode internal terminal that is electrically connected with the positive electrode sheets and accommodated in the battery can; and a positive electrode external terminal that is partially exposed outside the battery can, each of the positive electrode sheets includes a positive electrode metallic thin plate and a positive electrode active material layer formed by coating the positive electrode metallic thin plate with a positive electrode active material, a positive electrode electricity collecting portion that is a portion not coated with the positive electrode active material is formed on the positive electrode metallic thin plate of each of the positive electrode sheets, the positive electrode electricity collecting portion of each of the positive electrode sheets includes a positive electrode connecting portion serving as a connection portion with the positive electrode terminal and extends from one end of the positive electrode sheets, the negative electrode terminal includes:

a negative electrode internal terminal that is electrically connected with the negative electrode sheets and accommodated in the battery can; and a negative electrode external terminal that is partially exposed outside the battery can, each of the negative electrode sheets includes a negative electrode metallic thin plate and a negative electrode active material layer formed by coating the negative electrode metallic thin plate with a negative electrode active material, a negative electrode electricity collecting portion that is a portion not coated with the negative electrode active material is formed on the negative electrode metallic thin plate of each of the negative electrode sheets, the negative electrode electricity collecting portion of each of the negative electrode sheets includes a negative electrode connecting portion serving as a connection portion with the negative electrode terminal and extends from one end of the negative electrode sheets, wherein the positive electrode active material layer and the negative electrode active material layer overlap in a region of the electrode assembly to form an overlapping portion of each layer of the electrode assembly, a width direction of the overlapping portion is a direction orthogonal to a direction in which the positive electrode electricity collecting portion and the negative electrode electricity collecting portion extend, a line that passes through a center located between opposing widthwise edges of the overlapping portion of each layer in the width direction of the overlapping portion and extends in the direction in which the positive electrode electricity collecting portion and the negative electrode electricity collecting portion extend is defined as a reference line, a width direction of the positive electrode connecting portion is a direction orthogonal to a direction in which the positive electrode electricity collecting portion extends, a line that passes through a center of the positive electrode connecting portion in the width direction of the positive electrode connecting portion and extends in the direction in which the positive electrode electricity collecting portion extends is defined as a first connection central line, a width direction of the negative electrode connecting portion is a direction orthogonal to a direction in which the negative electrode electricity collecting portion extends, a line that passes through a center of the negative electrode connecting portion in the width direction of the negative electrode connecting portion and extends in the direction in which the negative electrode electricity collecting portion extends is defined as a second connection central line, a distance between the reference line and the first connection central line in the width direction of the overlapping portion is different from a distance between the reference line and the second connection central line in the width direction of the overlapping portion, so that the electrode assembly has an asymmetric structure, and one of the positive electrode connecting portion and the negative electrode connecting portion is a first connecting portion, and the other one of the positive electrode connecting portion and the negative electrode connecting portion is a second connecting portion, wherein the first connecting portion is positioned nearer to the reference line than both the second connecting portion and one of the positive electrode external terminal and the negative electrode external terminal that is electrically connected with the first connecting portion.

3. The power storage device according to claim 1, wherein the positive electrode metallic thin plate of each of the positive electrode sheets has a larger resistance per unit distance than that of the negative electrode metallic thin plate of each of the negative electrode sheets, and the distance between the reference line and the first central line is smaller than the distance between the if reference line and the second central line.

4. The power storage device according to claim 1, wherein the electrode assembly is configured such that the positive electrode sheets and the negative electrode sheets are alternately laminated with each other, and a separator is disposed between the positive electrode sheets and the negative electrode sheets.

5. The power storage device according to claim 1, wherein the power storage device is a secondary battery.

6. The power storage device according to claim 1, wherein an insulating partition member is arranged between the positive electrode electricity collecting portion and the negative electrode electricity collecting portion.

7. The power storage device according to claim 2, wherein
the positive electrode metallic thin plate of each of the positive electrode sheets has a larger resistance per unit distance than that of the negative electrode metallic thin plate of each of the negative electrode sheet, and
the distance between the reference line and the first connection central line is smaller than the distance between the reference line and the second connection central line.

8. The power storage device according to claim 2, wherein
the electrode assembly is configured such that the positive electrode sheets and the negative electrode sheets are alternately laminated with each other, and a separator is disposed between the positive electrode sheets and the negative electrode sheets.

9. The power storage device according to claim 2, wherein the power storage device is a secondary battery.

10. The power storage device according to claim 2, wherein an insulating partition member is arranged between the positive electrode electricity collecting portion and the negative electrode electricity collecting portion.

11. The power storage device according to claim 1, wherein the positive electrode terminal and the negative electrode terminal are insulated from the battery can by a pair of insulating rings.

12. The power storage device according to claim 1, wherein the electrode assembly is insulated from the battery can by a plurality of insulating sheets attached to an interior surfaces of the battery can.

13. The power storage device according to claim 2, wherein the positive electrode terminal and the negative electrode terminal are insulated from the battery can by a pair of insulating rings.

14. The power storage device according to claim 2, wherein the electrode assembly is insulated from the battery can by a plurality of insulating sheets attached to interior surfaces of the battery can.

* * * * *